(12) United States Patent
Li et al.

(10) Patent No.: US 11,031,701 B2
(45) Date of Patent: Jun. 8, 2021

(54) ELECTRONIC DEVICE

(71) Applicant: BEIJING XIAOMI MOBILE SOFTWARE CO., LTD., Beijing (CN)

(72) Inventors: Peng Li, Beijing (CN); Xuwang Cui, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/737,072

(22) Filed: Jan. 8, 2020

(65) Prior Publication Data

US 2021/0075121 A1    Mar. 11, 2021

(30) Foreign Application Priority Data

Sep. 5, 2019  (CN) .......................... 201910838737.3

(51) Int. Cl.
  *H01Q 21/00*     (2006.01)
  *H04M 1/02*      (2006.01)
  *H04B 1/38*      (2015.01)
  *H01Q 1/24*      (2006.01)
  *H01Q 21/06*     (2006.01)

(52) U.S. Cl.
  CPC ............. *H01Q 21/06* (2013.01); *H01Q 1/243* (2013.01); *H04M 1/0268* (2013.01)

(58) Field of Classification Search
  CPC .......... H04B 1/006; H04B 1/40; H04B 1/406; H04B 1/3833; H04M 1/0202; H04M 1/1214; H04M 1/0216; H04M 1/0222; H04M 1/0268; H04W 88/02; H01Q 1/242; H01Q 1/243; H01Q 3/01; H01Q 9/42; H01Q 21/06; H01Q 21/28; H01Q 21/29; H01Q 21/30; H01Q 25/00; H01Q 5/30; H01Q 5/307

See application file for complete search history.

(56) References Cited

U.S. PATENT DOCUMENTS 6,281,850 B1 *  8/2001  Klostermann ......... H01Q 1/243
                                              343/700 MS
9,812,771 B2 * 11/2017  Sung ..................... H01Q 1/273
9,964,995 B1 *  5/2018  Morrison ............... H01Q 1/243

(Continued)

OTHER PUBLICATIONS

Extended European Search Report dated Jul. 21, 2020 in European Patent Application No. 20151599.6, 16 pages.

(Continued)

*Primary Examiner* — Quochien B Vuong
(74) *Attorney, Agent, or Firm* — Oblon, McClelland, Maier & Neustadt, L.L.P.

(57) ABSTRACT

The disclosure relates to an electronic device, including a device body; a flexible screen assembled on the device body; and an antenna component assembled on the device body. A bent display status of the flexible screen matches with a contracted status of the device body, and an unfolded display status of the flexible screen matches with an extended status of the device body, so that the electronic device can be used in contraction and extension statuses. Furthermore, the main board of the device body can control at least one radiating element of the antenna component to form a first antenna scheme when the device body is in the extended status, and form a second antenna scheme when the device body is in the contracted status.

12 Claims, 6 Drawing Sheets

(56) References Cited

U.S. PATENT DOCUMENTS

| | | | |
|---|---|---|---|
| 10,079,425 B2 * | 9/2018 | Chun | H01Q 1/243 |
| 10,193,213 B2 * | 1/2019 | Liu | H01Q 1/243 |
| 10,439,670 B2 * | 10/2019 | Kang | H04B 1/006 |
| 10,736,211 B2 * | 8/2020 | Park | H04M 1/0277 |
| 2013/0241795 A1 | 9/2013 | Sung et al. | |
| 2014/0240178 A1 | 8/2014 | Chun et al. | |
| 2018/0358684 A1 | 12/2018 | Chun et al. | |
| 2019/0252786 A1 * | 8/2019 | Shin | H01Q 21/28 |
| 2019/0267699 A1 | 8/2019 | Kim et al. | |

OTHER PUBLICATIONS

Anonymous, "5G Americas White Paper: Advanced Antenna Systems for 5G", Aug. 31, 2019, table 12.2, Retrieved from the Internet: URL: https://www.5gamericas.org/wp-content/uploads/2019/08/5G-Americas_Advanced-Antenna-Systems-for-5G-White-Paper.pdf, XP055711594, p. 1-59 with cover page.

Electronics Notes: "5G Frequency Bands, Channels for FR1 & FR2 > Electronics Notes", Jul. 6, 2020 (Jul. 6, 2020), Retrieved from the Internet: URL: https://www.electronics-notes.com/articles/connectivity/5g-moblile-wireless-cellular/frequency-bands-channels-fr1-fr2.php, XP055711881, Table 5G FR1 Frequency bands on pp. 2 and 3, pp. 1-4.

Anonymous: "GSM frequency bands", Wikipedia, the free encyclopedia, Jan. 4, 2010 (Jan. 4, 2010), Retrieved from the Internet: URL: https://en.wikipedia.org/wiki/GSM_frequency_bands, XP055623862, Table on p. 2, pp. 1-7.

* cited by examiner

ELECTRONIC DEVICE

CROSS-REFERENCE TO RELATED APPLICATIONS

This application is based on and claims priority to Chinese Patent Application No. 201910838737.3, filed on Sep. 5, 2019, the entire contents of which are incorporated herein by reference.

TECHNICAL FIELD

The present disclosure relates to the technical field of electronics, and more particularly relates to an electronic device.

BACKGROUND 5G communication (5th generation mobile networks or 5th generation wireless systems) has been applied to electronic devices, such as mobile phones, more and more widely to increase the data rate, reduce delays, save energy sources, lower the cost, increase the system capacity and realize large-scale device connection. However, in order to achieve these functions, the complexity of antennas of the electronic devices is increased, resulting in many problems to the implementation of 5G antennas in electronic devices with various structures, such as flexible screens and telescopic types.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an electronic device including a device body; a flexible screen assembled on the device body; and an antenna component assembled on the device body, wherein the device body has a contracted status and an extended status, the flexible screen has a bent display status corresponding to the contracted status and an unfolded display status corresponding to the extended status, and the antenna component includes at least one tuning circuit and at least one radiating element conductively connected with the at least one tuning circuit, wherein the at least one tuning circuit is conductively connected with a main board of the device body, the main board, upon receiving a first signal, controls the device body to be in the extended status, and transmits a second signal to the at least one tuning circuit to enable the at least one radiating element to form a first antenna scheme, and the main board, upon receiving a third signal, controls the device body to be in the contracted status, and transmits a fourth signal to the at least one tuning circuit to enable the at least one radiating element to form a second antenna scheme different from the first antenna scheme.

According to an aspect, the first antenna scheme includes controlling the at least one radiating element to enable a 5G antenna function, and the second antenna scheme includes controlling the at least one radiating element enabling the 5G antenna function to disable the 5G antenna function.

According to another aspect, the device body includes an antenna working position, and the at least one radiating element includes at least one basic radiating element disposed at the antenna working position.

According to yet another aspect, the device body includes an internal assembly position, and the at least one radiating element includes at least one auxiliary radiating element disposed at the internal assembly position, and the antenna component includes a driving element, and the driving element is configured to cooperate with the at least one auxiliary radiating element to drive the at least one auxiliary radiating element to move to the internal assembly position according to the contracted status of the device body and move to the antenna working position according to the extended status of the device body.

According to yet another aspect, the at least one radiating element includes two basic radiating elements and one auxiliary radiating element, when the device body is in the contracted status, the two basic radiating elements are configured to cooperate with each other to form the second antenna scheme, and when the device body is changed to the extended status, the one auxiliary radiating element is configured to move to the antenna working position between the two basic radiating elements, one of the two basic radiating elements being configured to cooperate with the one auxiliary radiating element, and the other one of the two basic radiating element being configured to work alone to form the first antenna scheme.

According to yet another aspect, when the at least one auxiliary radiating element is in the internal assembly position, an insulating isolator is disposed between each of the at least one auxiliary radiating element and each of the at least one basic radiating element.

According to yet another aspect, each of the at least one auxiliary radiating element includes a metal structure element disposed on the device body, and the driving element is configured to cooperate with the metal structure element to drive the metal structure element to move towards the antenna working position or the internal assembly position.

According to yet another aspect, the device body includes at least two movable bodies which are movably connected, each of the at least two movable bodies is provided with a comb-shaped metal structure, and two adjacent comb-shaped metal structures are configured to movably cooperate with each other crosswise to enable the device body to be in the contracted status or the extended status, and the metal structure element includes at least a portion of the comb-shaped metal structure.

In an example, the driving element is disposed on at least one of left and right ends of the electronic device.

According to an aspect, the at least one radiating element includes a plurality of basic radiating elements, and an insulating isolator is disposed between adjacent basic radiating elements.

According to another aspect, the at least one radiating element includes a plurality of basic radiating elements, and at least two of the plurality of basic radiating elements are configured to be conductively connected.

In an example, the at least one basic radiating element is a metal shell of the electronic device.

In another example, the electronic device includes an insulating shell, and the antenna working position of the device body corresponds to a position of the insulating shell.

In yet another example, the at least one radiating element includes a plurality of radiating elements, and the at least one tuning circuit and the at least one radiating element are disposed in a one-to-one correspondence.

According to an aspect, when the device body is in the contracted status, the flexible screen in the bent display status at least covers a front face of the device body, and when the device body is in the extended status, the flexible screen in the unfolded display status at least covers the front face of the device body.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

It is to be understood that "first", "second" and similar terms used in the specification and claims of the present application are not to represent any sequence, number or importance but only to distinguish different parts. Likewise, similar terms such as "one" or "a/an" also do not represent a number limit but represent "at least one". It is also to be understood that term "and/or" used in the present disclosure refers to and includes one or any or all possible combinations of multiple associated items that are listed. Terms like "include" or "contain" refer to that an element or object appearing before "include" or "contain" covers an element or object and equivalent thereof listed after "include" or "contain" and does not exclude another element or object. Similar terms such as "connect" are not limited to physical or mechanical connection, and may include electrical connection, either direct or indirect.

Figure 1:
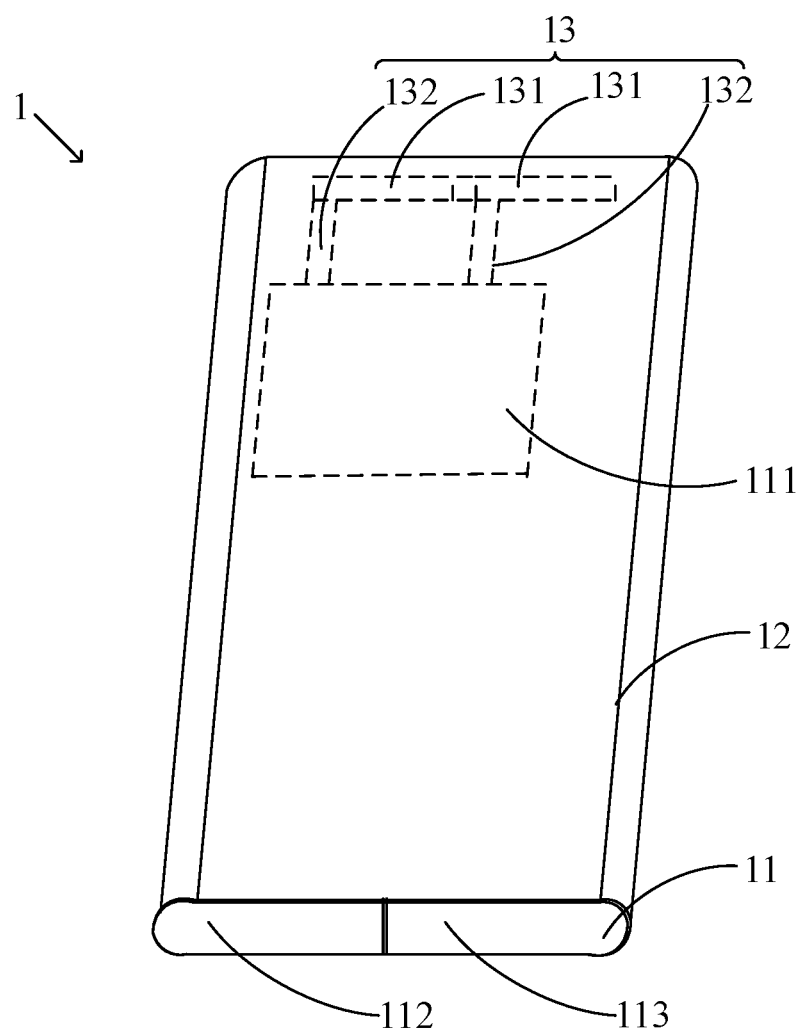
FIG. 1 is a schematic diagram of an electronic device in an exemplary aspect of the present disclosure when a device body is in a contracted status and a flexible screen is in a bent display status.
Figure 2:
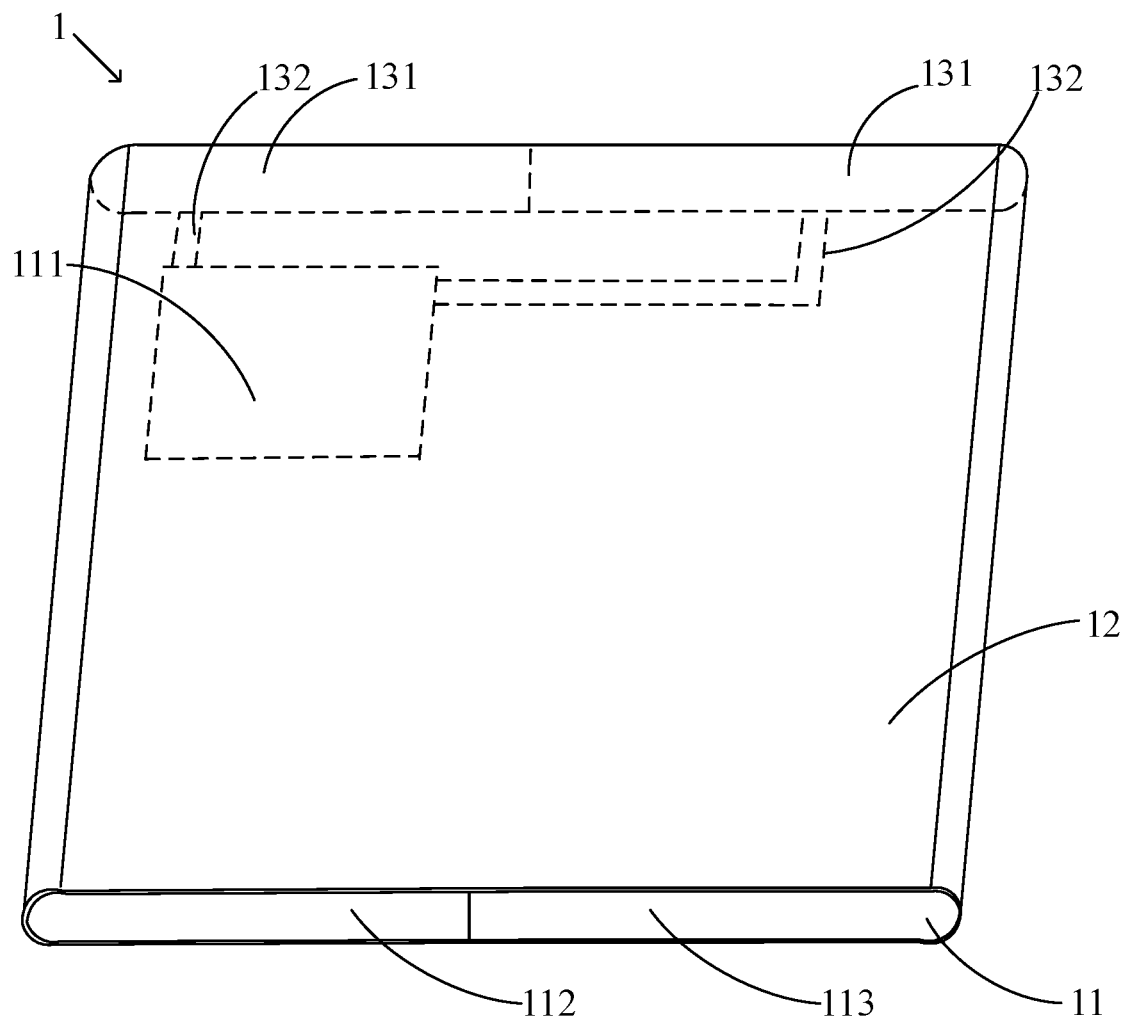
FIG. 2 is a schematic diagram of an electronic device in an exemplary aspect of the present disclosure when a device body is in an extended status and a flexible screen is in an unfolded display status.

FIG. 1 is a schematic diagram of an electronic device in an exemplary aspect of the present disclosure when a device body is in a contracted status. FIG. 2 is a schematic diagram of an electronic device in an exemplary aspect of the present disclosure when a device body is in an extended status. As shown in FIG. 1 and FIG. 2, an electronic device 1 may include: a device body 11 and a flexible screen 12 and an antenna component 13 which are assembled on the device body 11. The device body 11 can have a contracted status or an extended status, and the flexible screen 12 can have a bent display status corresponding to the contracted status or an unfolded display status corresponding to the extended status. The antenna component 13 can include tuning circuits 132 and radiating elements 131 conductively connected with the tuning circuits 132, and the tuning circuits 132 can be conductively connected with a main board 111 of the device body 11. Upon that a first signal is received, the main board 111 can control the device body 11 to be in the extended status, and can transmit a second signal to at least one tuning circuit 132 corresponding to at least one radiating element 131, so that the at least one radiating element 131 can enable a 5G antenna function. Upon receiving a third signal, the main board 111 can control the device body 11 to be in the contracted status, and can transmit a fourth signal to at least one tuning circuit 132 corresponding to the at least one radiating element 131 enabling the 5G antenna function, so that the at least one radiating element 131 can disable the 5G antenna function.

The bent display status of the flexible screen 12 can match with the contracted status of the device body 11, and the unfolded display status of the flexible screen 12 can match with the extended status of the device body 11, so that the electronic device 1 can be used in contraction and extension statuses. Furthermore, the main board 111 of the device body 11 can control the radiating elements 131 of the antenna component 13 to form a first antenna scheme when the device body 11 is in the extended status, and form a second antenna scheme when the device body 11 in the contracted status. Based on the above structure configuration, the communication function of the antenna component 13 can be intelligently matched with the use status of the device body 11, thereby improving the compatibility between the antenna component 13 and the electronic device 1, and optimizing the structure configuration and user experience in use of the electronic device 1.

The first signal may be a signal for starting video play software, video chat software and the like of the electronic device 1, or a control signal for switching the device body 11 to the extended status or switching the flexible screen 12 to the unfolded display status. The third signal may be a signal for closing the video play software, the video chat software and the like, or may be a control signal for switching the device body 11 to the contracted status or switching the flexible screen 12 to the bent display status, or may be a signal for starting a voice call, or a signal of pressing a screen locking key, or a touch signal, or the like. The second signal and the fourth signal may be control signals transmitted from the main board 111 to the tuning circuit 132 respectively.

The first antenna scheme may be controlling at least one radiating element 131 to enable a 5G antenna function, and the second antenna scheme may be controlling the at least one radiating element 131 enabling the 5G antenna function to disable the 5G antenna function. Or, the first antenna scheme may further include controlling one radiating element 131 or a plurality of radiating elements 131 cooperating with each other to enable radiation functions such as calling, messaging and the like. The second antenna scheme may further include controlling at least one radiating element 131 to enable radiation functions such as calling, messaging and the like. The present disclosure does not limit the specific contents of the first antenna scheme and the second antenna scheme. The antenna schemes formed by the functions and positions of at least one radiating element 131 can be changed according to the status of the device body 1 so as to achieve antenna functions matched with the use statuses of the device body.

For example, upon that a user opens video play software to watch a movie, the main board 111 of the device body 11 may receive a first signal related to opening of the video play software, control the device body 11 to be in the extended status according to the first signal, and transmit a second signal to the at least one tuning circuit 132 corresponding to at least one radiating element 131, so that the at least one radiating element 131 can enable the 5G antenna function. In such a case, the device body 11 is in the extended status, the flexible screen 12 is in the unfolded display status, and the electronic device 1 has a larger display area, thereby improving the visual effect when the user is watching the movie. The at least one radiating element 131 can also enable the 5G antenna function, thereby providing a higher transmission speed and quality for the above movie play.

Upon that the user closes the video play software, the main board 111 may receive a third signal related to closing of the video play software, can control the device body 11 to be in the contracted status according to the third signal, and simultaneously, can transmit a fourth signal to at least one tuning circuit 132 corresponding to the at least one radiating element 131 enabling the 5G antenna function, so that the at least one radiating element 131 can disable the 5G antenna function. In such a case, the device body 11 is in the contracted status, and the flexible screen 12 is in the bent display status, so that it can be easy for the user to grasp the electronic device and use other functions. The at least one radiating element 131 enabling the 5G antenna function also can disable the 5G antenna function and switch to 4G, 3G, 2G or other common antenna functions, thereby reducing the power consumption of the electronic device 1 and improving the control intelligence of the electronic device 1.

It can be known from the above examples, based on the structure configuration of the present disclosure, the relevance and compatibility between the performance of the antenna component 13 and the structural change of the electronic device 1 can be increased, and the structure configuration and user experience in use of the electronic device 1 can be optimized.

It is to be noted that in a case that the device body 11 is in the contracted status, the flexible screen 12 in the bent display status can cover the front face of the device body 11; and in a case that the device body 11 is in the extended status, the flexible screen 12 in the unfolded display status can cover the front face of the device body 11, thereby improving the full-screen display effect and the visual experience of the user. The front face of the device body 11 may be a face facing a user during the use of the electronic device 1, and the flexible screen 12 may also cover other faces such as the front face, the side face and the back face of the device body 11 so as to present different display effects according to the functions of the electronic device 1.

The number, configuration mode and configuration position of the at least one radiating elements 131 of the antenna component 13 can directly degrade the antenna function and the structural compatibility between the antenna component 13 and the device body 11. The configuration mode of the at least one radiating elements 131 are exemplarily described below.

In an aspect, the device body 11 may include an antenna working position. The antenna working position may be a marginal region inside the device body 11 or a shell structure position of the device body 11. The antenna working position is provided for achieving an antenna function and is not limited by the present disclosure. The radiating elements 131 may include basic radiating elements 1311 disposed at the antenna working position, and the basic radiating elements 1311 may be fixedly disposed at the antenna working position without position change or may make a relative movement within the antenna working position according to the switching between the contracted status and the extended status of the device body 11.

It is to be noted that in a case that the antenna working position is the shell structure position of the device body 11, the at least one radiating element 131 may directly serve as a metal shell of the electronic device 1 to reduce the occupation of the internal space of the electronic device 1 by the antenna component 13. Or, in a case that the antenna working position is in a marginal region inside the device body 11, the electronic device 1 may include an insulating shell, and the at least one radiating element 131 may be disposed in a marginal region corresponding to the insulating shell, so as to provide different appearances and textures to the shell of the electronic device 1 and improve the aesthetics of the electronic device 1.

As shown in FIG. 1 and FIG. 2, the device body 11 may include two movable bodies 112 and 113 which are movably connected, the radiating elements 131 may include two basic radiating elements 1311, and the two basic radiating elements 1311 may be disposed on the two movable bodies 112 and 113 respectively. In a case that the two movable bodies 112 and 113 are assembled and matched and the device body 11 is in the contracted status, one of the two basic radiating elements 1311 may be disposed on the movable body 112 on the left side of FIG. 1 and FIG. 2, the other basic radiating elements 1311 may be disposed on the movable body 113 on the right side of FIG. 1 and FIG. 2, and the two basic radiating elements 1311 may be conductively connected and may be connected with the tuning circuits 132 respectively to realize corresponding antenna functions such as calling, messaging, data transmission and the like. In a case that the two movable bodies 112 and 113 generate a relative displacement to change the device body 11 to the extended status, the basic radiating elements 1311 disposed on the left and right movable bodies can be separated, and the relative position between the two basic radiating elements 1311 may be changed. The main board 111 may choose to transmit a first signal to the tuning circuit 132 corresponding to one of the two basic radiating elements 1311, so that the basic radiating element 1311 can enable a 5G antenna function, and the other one of the two basic radiating elements 1311 can be configured to enable the antenna functions such as calling, message receiving and the like.

Figure 3:
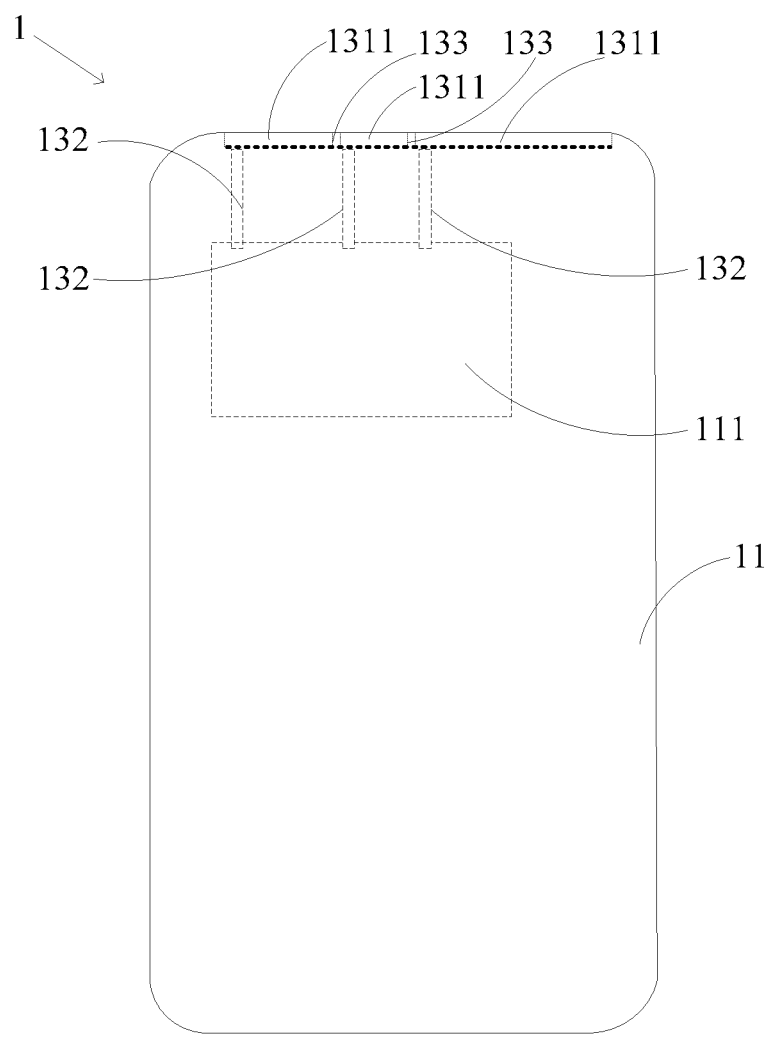
FIG. 3 is a structural perspective diagram of an electronic device in an exemplary aspect of the present disclosure.
Figure 4:
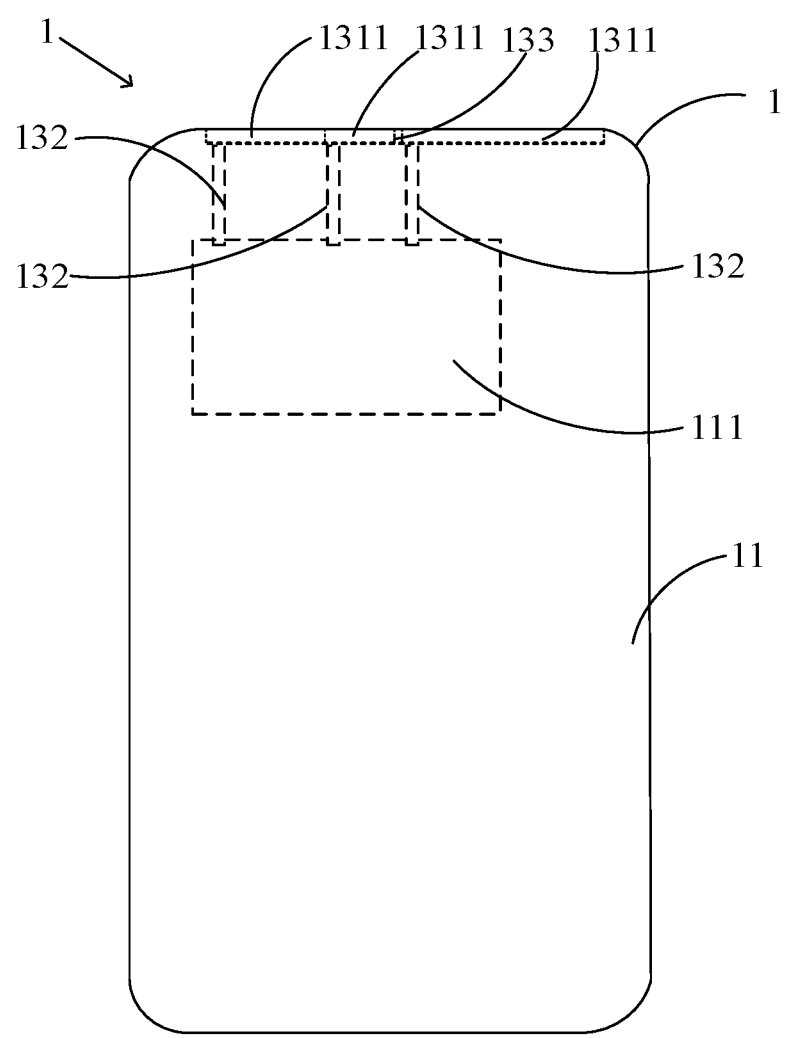
FIG. 4 is a structural perspective diagram of an electronic device in another exemplary aspect of the present disclosure.

As shown in FIG. 3, the radiating elements 131 may include a plurality of basic radiating elements 1311, and an insulating isolator 133 may be disposed between every adjacent basic radiating elements 1311 to avoid the disturbance between the adjacent basic radiating elements 1311, so that each basic radiating element 1311 can work alone to realize corresponding antenna functions. Or, as shown in FIG. 4, at least two basic radiating elements 1311 may be conductively connected with each other, and radiation parameters can thus be adjusted through the cooperation between the at least two basic radiating elements 1311, thereby realizing corresponding antenna functions.

In a case that there are a plurality of radiating elements 131, the tuning circuits 132 and the radiating elements 131 may be disposed in a one-to-one correspondence, thereby facilitating the control on the radiating elements 131 by the main board 111. Or, at least two radiating elements 131 may cooperate with one tuning circuit 132, so that the structure and space, inside the device body 11, occupied by the circuit board provided with the tuning circuit 132 can be reduced. Furthermore, the tuning circuit 132 may be conductively connected with one end of the radiating element 131 to reduce the structure disturbance from the tuning circuit 132 to the radiating element 131, or may conductively cooperate with other positions of the radiating element 131, which is not limited in the present disclosure.

In another aspect, the device body 11 also may include an internal assembly position, and the at least one radiating element 131 may include an auxiliary radiating element 1312 disposed at the internal assembly position. The antenna component 13 also may include a driving element 14, and the driving element 14 can cooperate with the auxiliary radiating element 1312 to drive the auxiliary radiating element 1312 to move to the internal assembly position according to the contracted status of the device body 11 and move to the antenna working position according to the extended status of the device body 11. The driving element 14 can enable the auxiliary radiating element 1312 to move to the assembly position according to the contracted status of the device body 11 and move to the antenna working position according to the extended status of the device body 11, therefore, on the one hand, the number of the radiating elements 131 at the antenna working position can be increased in a case that the device body 11 is in the extended status, and the realization of the first antenna scheme can be ensured; and on the other hand, the space occupation of the antenna working position by the at least one radiating element 131 under the second antenna scheme can be avoided.

Figure 5:
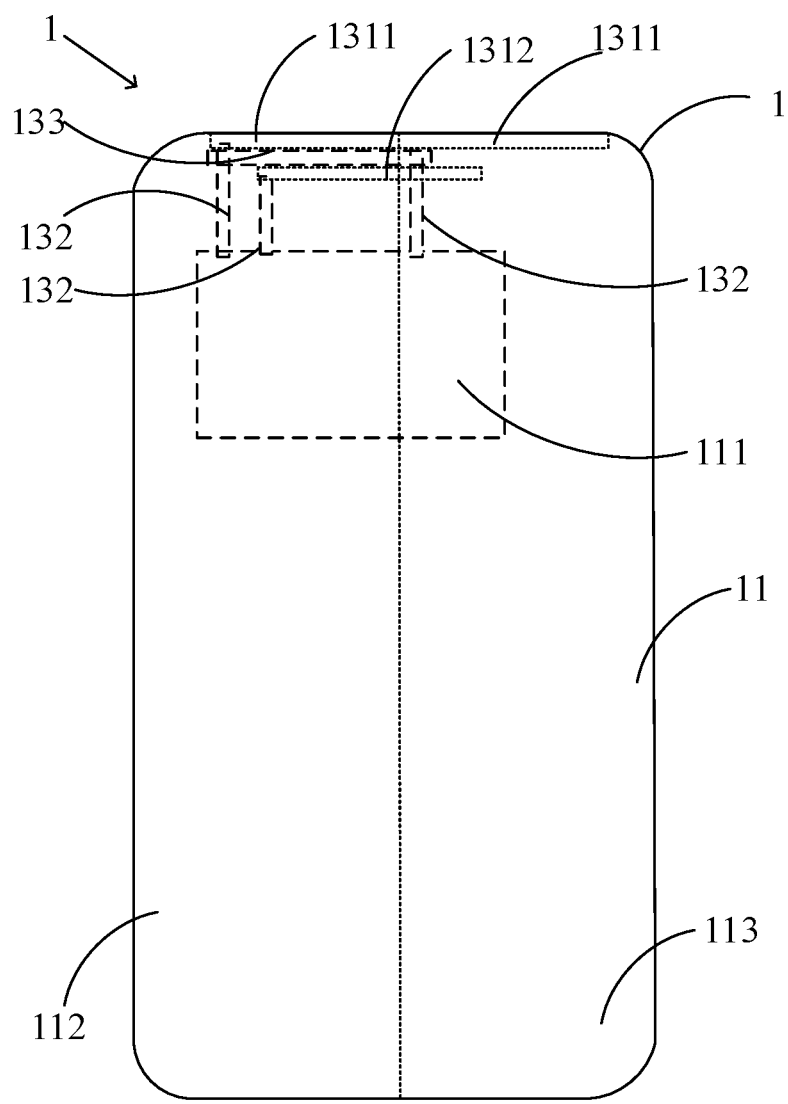
FIG. 5 is a schematic diagram of an electronic device in another exemplary aspect of the present disclosure when a device body is in a contracted status and a flexible screen is in a bent display status.
Figure 6:
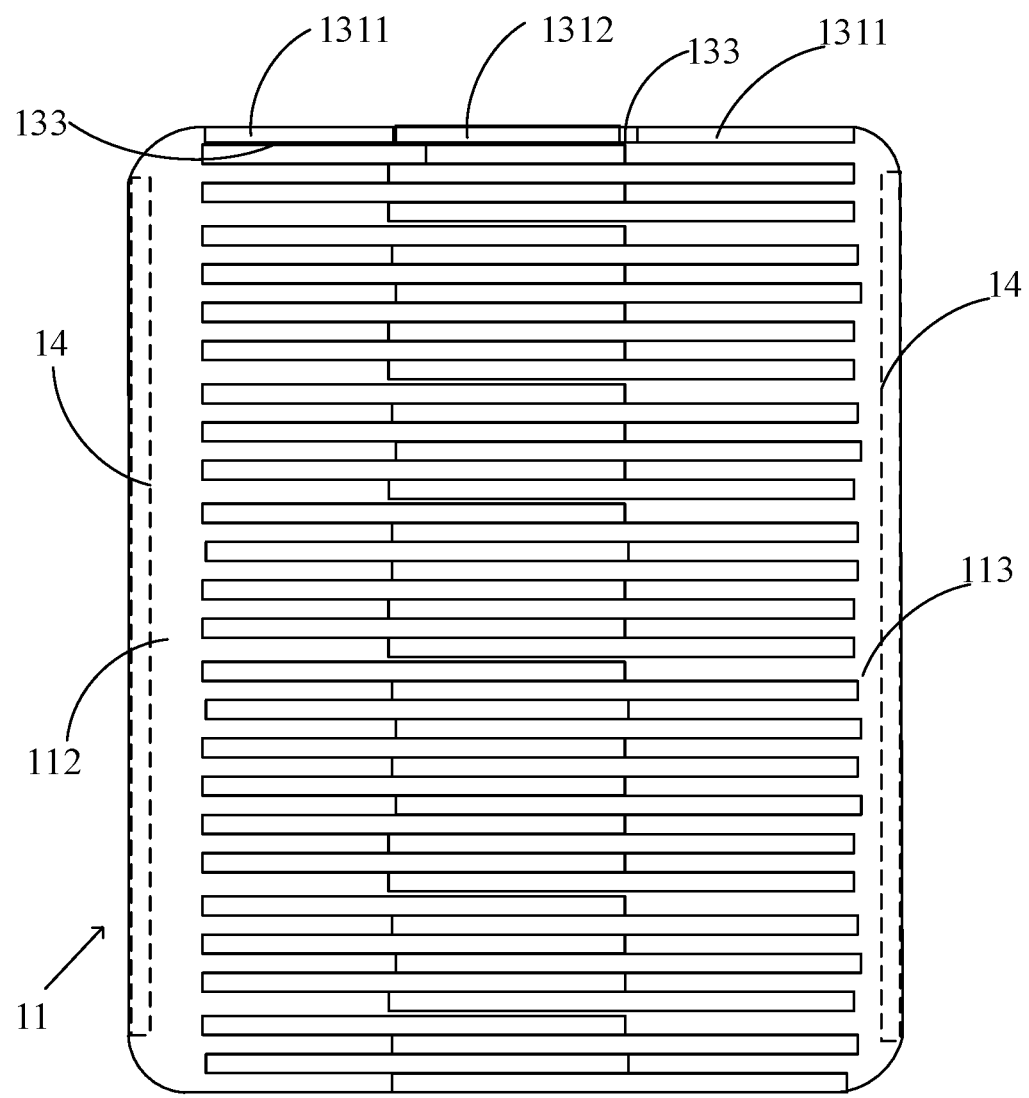
FIG. 6 is a schematic diagram of an electronic device in another exemplary aspect of the present disclosure when a device body is in an extended status and a flexible screen is in an unfolded display status.

As shown in FIG. 5 and FIG. 6, the device body 11 may include two movable bodies 112 and 113 which are movably connected, the at least one radiating element 131 may include two basic radiating elements 1311 and one auxiliary radiating element 1312, and the two basic radiating elements 1311 may be disposed on the two movable bodies 112 and 113 respectively. In a case that the two movable bodies 112 and 113 are assembled and matched and the device body 11 is in the contracted status, one of the two basic radiating elements 1311 may be disposed on the movable body 112 on the left side in FIG. 5 and FIG. 6, the other one of the two basic radiating elements 1311 may be disposed on the movable body 113 on the right side in FIG. 5 and FIG. 6, and the two basic radiating elements 1311 may be conductively connected with each other and may be connected with at least one tuning circuit 132 respectively to realize a second antenna scheme having antenna functions such as calling, messaging, data transmission and the like. The one auxiliary radiating element 1312 may be disposed at the internal assembly position inside the device body 11 and may be in a non-working status. In a case that the two movable bodies 112 and 113 generate a relative displacement to change the device body 11 to the extended status, the two basic radiating elements 1311 disposed on the left and right movable bodies can be separated, and the relative position between the basic radiating elements 1311 may be changed. The one auxiliary radiating element 1312 can be controlled by the driving element 14 to move from the internal assembly position to the position between the two basic radiating elements 1311, and the one auxiliary radiating element 1312 can be conductively connected with the left basic radiating element 1311 to replace the position of the original right basic radiating element 1311 and realize antenna functions such as calling, message receiving and the like. An insulating isolator 133 may be disposed between the right basic radiating element 1311 and the one auxiliary radiating element 1312 to realize independent antenna functions. The one auxiliary radiating element 1312 can cooperate with the left basic radiating element 1311, and the right basic radiating element 1311 can work alone, thereby forming the first antenna scheme. The main board 111 may choose to transmit a first signal to the tuning circuit 132 corresponding to the right basic radiating element 1311, so that the right basic radiating element 1311 can enable a 5G antenna function. Therefore, the above structure configuration can ensure the antenna performance of the electronic device 1 no matter the flexible screen 12 is in the bent display status or in the unfolded display status, and also improve the utilization efficiency of internal space and structural flexibility of the device body 11 in different statuses.

It is to be noted that the driving element 14 may be disposed on at least one of the left and right ends of the electronic device 1 to facilitate the driving control and reduce the structure occupation of the center position inside the device body 11.

The auxiliary radiating element 1312 may include a metal structure element disposed on the device body 11, and the driving element 14 can cooperate with the metal structure element to drive the metal structure element to move towards the antenna working position or the internal assembly position. The metal structure element may be a structure element movably assembled on the device body 11, so that the movement of the metal structure element can be controlled conveniently.

Or, in a case that the device body 11 includes at least two movable bodies 112 and 113 which are movably connected, the movable bodies 112 and 113 may be provided with comb-shaped metal structures respectively, and two adjacent comb-shaped metal structures can be driven by the driving element 14 to movably cooperate with each other crosswise to enable the device body 11 to be in the contracted status or the extended status. The metal structure element as the auxiliary radiating element 1312 may have at least a portion of a comb-shaped metal structure, such as metal combs on two ends of the comb-shaped metal structure. The position of the metal combs can change between the internal assembly position and the antenna working position along with the switching between the contracted status and the extended status of the device body 11. According to the above structure configuration, the position of the auxiliary radiating element 1312 can be changed by means of the metal structure of the device body 11, thereby reducing the structural complexity of the electronic device 1.

In the above aspects, in a case that the auxiliary radiating element 1312 is in the internal assembly position, an insulating isolator 133 may be disposed between the auxiliary radiating element 1312 and the basic radiating element 1311 to avoid the disturbance to the antenna functions of the basic radiating element 1311 when the auxiliary radiating element 1312 is in a non-working internal assembly position.

The electronic device 1 may be a mobile phone, a vehicle-mounted terminal, a tablet computer, a medical terminal and the like, but is not limited in the present disclosure.

The bent display status of the flexible screen 12 can match with the contracted status of the device body 11, and the unfolded display status of the flexible screen 12 can match with the extended status of the device body 11, so that the electronic device 1 can be used in contraction and extension statuses. Furthermore, the main board 111 of the device body 11 may control at least one radiating element 131 of the antenna component 13 to enable a 5G antenna function when the device body 11 is in the extended status, and disable the 5G antenna function when the device body 11 is in the contracted status. Based on the above structure configuration, the communication function of the antenna component 13 may be intelligently matched with the use status of the device body 11, thereby improving the compatibility between the antenna component 13 and the electronic device 1, and optimizing the structure configuration and user experience in use of the electronic device 1.

According to some aspects of the present disclosure, an electronic device is provided, including: a device body and a flexible screen and an antenna component which are assembled on the device body;

the device body has a contracted status and an extended status, and the flexible screen has a bent display status corresponding to the contracted status and an unfolded display status corresponding to the extended status;

the antenna component comprises at least one tuning circuit and at least one radiating element conductively connected with the at least one tuning circuit, and the at least one tuning circuit is conductively connected with a main board of the device body;

the main board, upon receiving a first signal, control the device body to be in the extended status, and transmit a second signal to the at least one tuning circuit to enable the at least one radiating element to form a first antenna scheme; and the main board, upon receiving a third signal, control the device body to be in the contracted status, and transmit a fourth signal to the at least one tuning circuit to enable the at least one radiating element to form a second antenna scheme different from the first antenna scheme.

In some aspects, the first antenna scheme may include controlling the at least one radiating element to enable a 5G antenna function; and the second antenna scheme may include controlling the at least one radiating element enabling the 5G antenna function to disable the 5G antenna function.

In some aspects, the device body may include an antenna working position, and the at least one radiating element may include at least one basic radiating element disposed at the antenna working position.

In some aspects, the device body also may include an internal assembly position, and the at least one radiating element may include at least one auxiliary radiating element disposed at the internal assembly position; and the antenna component also may include a driving element, and the driving element is configured to cooperate with the at least one auxiliary radiating element to drive the at least one auxiliary radiating element to move to the internal assembly position according to the contracted status of the device body and move to the antenna working position according to the extended status of the device body.

In some aspects, the at least one radiating element may include two basic radiating elements and one auxiliary radiating element; in a case that the device body is in the contracted status, the two basic radiating elements are configured to cooperate with each other to form the second antenna scheme; and upon that the device body is changed to the extended status, the one auxiliary radiating element is configured to move to the antenna working position between the two basic radiating elements, one of the two basic radiating elements being configured to cooperate with the one auxiliary radiating element, and the other one of the two basic radiating elements being configured to work alone to form the first antenna scheme.

In some aspects, in a case that the at least one auxiliary radiating element is in the internal assembly position, an insulating isolator is disposed between the at least one auxiliary radiating element and the at least one basic radiating element.

In some aspects, each of the at least one auxiliary radiating element comprises a metal structure element disposed on the device body, and the driving element is configured to cooperate with the metal structure element to drive the metal structure element to move towards the antenna working position or the internal assembly position.

In some aspects, the device body may include at least two movable bodies which are movably connected; each of the at least two movable bodies is provided with a comb-shaped metal structure, and two adjacent comb-shaped metal structures are configured to movably cooperate with each other crosswise to enable the device body to be in the contracted status or the extended status; and the metal structure element may include at least a portion of the comb-shaped metal structure.

In some aspects, the driving element is disposed on at least one of left and right ends of the electronic device.

In some aspects, the at least one radiating element may include a plurality of basic radiating elements, and an insulating isolator is disposed between adjacent basic radiating elements.

In some aspects, the at least one radiating element may include a plurality of basic radiating elements, and at least two of the plurality of basic radiating elements are configured to be conductively connected.

In some aspects, the at least one basic radiating element is a metal shell of the electronic device.

In some aspects, the electronic device may include an insulating shell, and the antenna working position of the device body corresponds to a position of the insulating shell.

In some aspects, the at least one radiating element may include a plurality of radiating elements, and the at least one tuning circuit and the at least one radiating element are disposed in a one-to-one correspondence.

In some aspects, in a case that the device body is in the contracted status, the flexible screen in the bent display status may at least cover a front face of the device body; and in a case that the device body is in the extended status, the flexible screen in the unfolded display status may at least cover the front face of the device body.

The technical schemes provided by the aspects of the present disclosure can have the following beneficial effects:

a bent display status of a flexible screen can match with a contracted status of a device body, and an unfolded display status of the flexible screen can match with an extended status of the device body, so that the electronic device can be used in contraction and extension statuses. Furthermore, a main board of the device body can control at least one radiating element of an antenna component to form a first antenna scheme when the device body is in the extended status, and to form a second antenna scheme when the device body is in the contracted status. Based on the above structure configuration, the communication function of the antenna component can be intelligently matched with the use status of the device body, thereby improving the compatibility between the antenna component and the electronic device, and optimizing the structure configuration and user experience in use of the electronic device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the technical schemes of the present disclosure here. This application is intended to cover any variations, uses, or adaptations of the present disclosure following the general principles thereof and including such departures from the present disclosure as come within known or customary practice in the art. It is intended that the specification and aspects be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic device, comprising:
    a device body;
    a flexible screen assembled on the device body; and
    an antenna component assembled on the device body, wherein
        the device body has a contracted status and an extended status,
        the flexible screen has a bent display status corresponding to the contracted status and an unfolded display status corresponding to the extended status, and
        the antenna component comprises at least one tuning circuit and at least one radiating element conductively connected with the at least one tuning circuit, wherein
        the at least one tuning circuit is conductively connected with a main board of the device body,
        the main board, upon receiving a first signal, controls the device body to be in the extended status, and transmits a second signal to the at least one tuning circuit to enable the at least one radiating element to form a first antenna scheme,
        the main hoard, upon receiving a third signal, controls the device body to be in the contracted status, and transmits a fourth signal to the at least one tuning circuit to enable the at least one radiating element to form a second antenna scheme different from the first antenna scheme,
        the device body comprises an antenna working position, and the at least one radiating element comprises at least one basic radiating element disposed at the antenna working position,
        the device body comprises an internal assembly position, and the at least one radiating element comprises at least one auxiliary radiating element disposed at the internal assembly position, when the at least one auxiliary radiating element is in the internal assembly position, an insulating isolator is disposed between each of the at least one auxiliary radiating element and each of the at least one basic radiating element, and
        the antenna component comprises a driving element and the driving element is configured to cooperate with the at least one auxiliary radiating element to drive the at least one auxiliary radiating element to move to the internal assembly position according to the contracted status of the device body and move to the antenna working position according to the extended status of the device body.

2. The electronic device according to claim 1, wherein the first antenna scheme comprises controlling the at least one radiating element to enable a 5G antenna function, and the second antenna scheme comprises controlling the at least one radiating element enabling the 5G antenna function to disable the 5G antenna function.

3. The electronic device according to claim 1, wherein the at least one radiating element comprises two basic radiating elements and one auxiliary radiating element,
    when the device body is in the contracted status, the two basic radiating elements are configured to cooperate with each other to form the second antenna scheme, and
    when the device body is changed to the extended status, the one auxiliary radiating element is configured to move to the antenna working position between the two basic radiating elements, one of the two basic radiating elements being configured to cooperate with the one auxiliary radiating element, and the other one of the two basic radiating element being configured to work alone to form the first antenna scheme.

4. The electronic device according to claim 1, wherein each of the at least one auxiliary radiating element comprises a metal structure element disposed on the device body, and the driving element is configured to cooperate with the metal structure element to drive the metal structure element to move towards the antenna working position or the internal assembly position.

5. The electronic device according to claim 4, wherein the device body comprises at least two movable bodies which are movably connected, each of the at least two movable bodies is provided with a comb-shaped metal structure, and two adjacent comb-shaped metal structures are configured to movably cooperate with each other crosswise to enable the device body to be in the contracted status or the extended status, and the metal structure element comprises at least a portion of the comb-shaped metal structure.

6. The electronic device according to claim 4, wherein the driving element is disposed on at least one of left and right ends of the electronic device.

7. The electronic device according to claim 1, wherein the at least one radiating element comprises a plurality of basic radiating elements, and an insulating isolator is disposed between adjacent basic radiating elements.

8. The electronic device according to claim 1, wherein the at least one radiating element comprises a plurality of basic radiating elements, and at least two of the plurality of basic radiating elements are configured to be conductively connected.

9. The electronic device according to claim 1, wherein the at least one basic radiating element is a metal shell of the electronic device.

10. The electronic device according to claim 1, wherein the electronic device comprises an insulating shell, and the antenna working position of the device body corresponds to a position of the insulating shell.

11. The electronic device according to claim 1, wherein the at least one radiating element comprises a plurality of radiating elements, and the at least one tuning circuit and the at least one radiating element are disposed in a one-to-one correspondence.

12. The electronic device according to claim 1, wherein when the device body is in the contracted status, the flexible screen in the bent display status at least covers a front face of the device body, and when the device body is in the extended status, the flexible screen in the unfolded display status at least covers the front face of the device body.

* * * * *